US010679070B1

(12) United States Patent
Poutivski (10) Patent No.: US 10,679,070 B1
(45) Date of Patent: Jun. 9, 2020

(54) SYSTEMS AND METHODS FOR A VIDEO UNDERSTANDING PLATFORM (71) Applicant: Facebook, Inc., Menlo Park, CA (US)

(72) Inventor: Iouri Poutivski, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 217 days.

(21) Appl. No.: 15/903,133

(22) Filed: Feb. 23, 2018

(51) Int. Cl.
G06K 9/00 (2006.01)
H04N 19/59 (2014.01)
G06N 20/00 (2019.01)

(52) U.S. Cl.
CPC ..... *G06K 9/00765* (2013.01); *G06K 9/00718* (2013.01); *G06K 9/00751* (2013.01); *G06N 20/00* (2019.01); *H04N 19/59* (2014.11)

(58) Field of Classification Search
None
See application file for complete search history.

(56) References Cited

U.S. PATENT DOCUMENTS

| | | | | |
|---|---|---|---|---|
| 9,582,762 | B1* | 2/2017 | Cosic | G06N 5/04 |
| 2006/0179020 | A1* | 8/2006 | Bradski | G06K 9/00523 |
| | | | | 706/20 |
| 2009/0034622 | A1* | 2/2009 | Huchet | H04N 19/176 |
| | | | | 375/240.16 |
| 2009/0245387 | A1* | 10/2009 | Hvidsten | G06T 5/003 |
| | | | | 375/240.25 |
| 2009/0274450 | A1* | 11/2009 | Ishii | G11B 20/00007 |
| | | | | 386/326 |
| 2013/0094564 | A1* | 4/2013 | Yang | H04N 19/154 |
| | | | | 375/240.02 |
| 2015/0046674 | A1* | 2/2015 | Barry | G06F 1/3203 |
| | | | | 712/7 |
| 2015/0046677 | A1* | 2/2015 | Moloney | G09G 5/397 |
| | | | | 712/29 |
| 2017/0213154 | A1* | 7/2017 | Hammond | G06F 9/451 |

(Continued)

OTHER PUBLICATIONS

Lee et al, Deep Neural Network Self-training Based on Unsupervised Learning and Dropout, International Journal of Fuzzy Logic and Intelligent Systems, vol. 17, No. 1, Mar. 2017, pp. 1-9 (Year: 2017).*

(Continued)

*Primary Examiner* — Andrae S Allison
(74) *Attorney, Agent, or Firm* — FisherBroyles, LLP (57) ABSTRACT

The disclosed computer-implemented method may include identifying data format requirements for one or more machine-learning-based audio/video classifiers. The classifiers may be configured to detect classifiable features of decoded audio/video data. The method may also include decoding once, for the one or more classifiers, a video stream into audio/video data based on the identified data format requirements, and creating a new instance of each of the one or more classifiers. In addition, the method may include transforming the audio/video data for each instance based on the respective data format requirements and providing the respective transformed audio/video data to each instance. The method may also include performing, in parallel, classification of each transformed audio/video data by each respective instance and then terminating each instance of the one or more classifiers. Various other methods, systems, and computer-readable media are also disclosed.

20 Claims, 5 Drawing Sheets

(56) References Cited

U.S. PATENT DOCUMENTS

| | | | |
|---|---|---|---|
| 2017/0262735 A1* | 9/2017 | Ros Sanchez | G06K 9/6256 |
| 2017/0278289 A1* | 9/2017 | Marino | G06T 7/44 |
| 2018/0046926 A1* | 2/2018 | Achin | G06N 5/02 |
| 2018/0082212 A1* | 3/2018 | Faivishevsky | G06N 20/00 |

OTHER PUBLICATIONS

Wen, Haiguang, et al. "Neural encoding and decoding with deep learning for dynamic natural vision." Cerebral Cortex 28.12 (2017): 4136-4160. (Year: 2017).*

Dmitrienko et al, Neural Networks Art: Solving Problems with Multiple Solutions and New Teaching Algorithm, The Open Neurology Journal, 2014, 8, 15-21 (Year: 2014).*

Ersoy et al, Parallel, Self-Organizing, Hierarchical Neural Networks, IEEE Transactions on Neural Networks. vol. I. No. 2. Jun. 1990 (Year: 1990).*

Reddy, V.. "Self Trained Artificial Neural Network." (2004). (Year: 2004).*

* cited by examiner

SYSTEMS AND METHODS FOR A VIDEO UNDERSTANDING PLATFORM

BACKGROUND

The rapid advancement and progression of internet technologies has enabled users to upload and post audio/video content online or stream live audio/video feeds at a dizzying pace. Social networks and other web-based services have traditionally attempted to classify such audio/video for a variety of reasons. For example, such services may wish to tag audio/video content based on objects detected in video content, faces recognized, locations detected, etc., in order to index the same. Similarly, a service may want to recognize, flag, and/or remove prohibited content, such as copyrighted material, offensive or pornographic material, hate speech, and other violations of the service's terms of service. As the volume of audio/video content uploaded and/or streamed by users increases, however, organizing and/or classifying such content may become increasingly challenging.

Conventional audio/video classification systems typically require application of various machine-learning-based classifiers, with each classifier configured to detect a specific classifiable feature such as object detection, face recognition, music identification, etc. Each classifier may require video data in a specific format, such as resolution, aspect ratio, etc. Unfortunately, conventional classification systems typically perform separate decode operations for each discrete classifier, resulting in the performance of multiple decode operations. This may, in turn, add significant processing overhead, making real-time (or even near real-time) classification a near impossibility. In addition, when classifiers are updated, conventional classification systems may be unable to gracefully phase out older classifiers as additional audio/video streams are input into the classification system. For example, classifier updates may necessitate waiting for all current classification operations to finish and/or pausing new classification operations, which may result in unfavorable operational delays.

SUMMARY

As will be described in greater detail below, the instant disclosure describes a video understanding platform designed to efficiently handle the real-time (or near real-time) classification of a tremendous volume of audio/video streams (e.g., hundreds of millions of videos per day). In one example, a computer-implemented method for performing such a task may include (1) identifying data format requirements for one or more machine-learning-based audio/video classifiers, with the classifiers being configured to detect classifiable features of decoded audio/video data, (2) decoding once, for the one or more classifiers, a video stream into audio/video data based on the identified data format requirements, (3) creating a new instance of each of the one or more classifiers, (4) transforming the audio/video data for each instance based on the respective data format requirements, (5) providing the respective transformed audio/video data to each instance, (6) performing, in parallel, classification of each transformed audio/video data by each respective instance, and (7) terminating each instance of the one or more classifiers.

In some examples, the method may include updating at least one of the one or more classifiers independently from instances of the one or more classifiers. In these examples, the new instances of each of the one or more classifiers may be created from updated versions of the one or more classifiers. In addition, the data format requirements may be identified from updated versions of the one or more classifiers.

In some embodiments, transforming the audio/video data may further include downsampling the audio/video data for at least one of the instances of the one or more classifiers when the audio/video data exceeds the data format requirements for the at least one instance. Additionally or alternatively, transforming the audio/video data may include cropping the audio/video data for at least one of the instances of the one or more classifiers to satisfy the data format requirements for the at least one instance.

In one example, decoding the video stream may include decoding the video data into the lowest quality video data that satisfies the data format requirements.

In addition, a corresponding system for a video understanding platform may include one or more processors and a memory device comprising instructions that, when executed by the one or more processors, cause the system to (1) identify data format requirements for one or more machine-learning-based audio/video classifiers, with the classifiers being configured to detect classifiable features of decoded audio/video data, (2) decode once, for the one or more classifiers, a video stream into audio/video data based on the identified data format requirements, (3) create a new instance of each of the one or more classifiers, (4) transform the audio/video data for each instance based on the respective data format requirements, (5) provide the respective transformed audio/video data to each instance, (6) perform, in parallel, classification of each transformed audio/video data by each respective instance, and (7) terminate each instance of the one or more classifiers.

In some examples, the instructions may include instructions for updating at least one of the one or more classifiers independently from instances of the one or more classifiers. In these examples, the new instances of each of the one or more classifiers may be created from updated versions of the one or more classifiers. In addition, the data format requirements may be identified from updated versions of the one or more classifiers.

In some embodiments, transforming the audio/video data may further include downsampling the audio/video data for at least one of the instances of the one or more classifiers when the audio/video data exceeds the data format requirements for the at least one instance. Additionally or alternatively, transforming the audio/video data may further include cropping the audio/video data for at least one of the instances of the one or more classifiers to satisfy the data format requirements for the at least one instance.

In one example, decoding the video stream may further include decoding the video data into the lowest quality video data that satisfies the data format requirements.

In some examples, the above-described method may be encoded as computer-readable instructions on a computer-readable medium. For example, a computer-readable medium may include one or more computer-executable instructions that, when executed by at least one processor of a computing device, may cause the computing device to (1) identify data format requirements for one or more machine-learning-based audio/video classifiers, with the classifiers being configured to detect classifiable features of decoded audio/video data, (2) decode once, for the one or more classifiers, a video stream into audio/video data based on the identified data format requirements, (3) create a new instance of each of the one or more classifiers, (4) transform the audio/video data for each instance based on the respective data format requirements, (5) provide the respective transformed audio/video data to each instance, (6) perform, in parallel, classification of each transformed audio/video data by each respective instance, and (7) terminate each instance of the one or more classifiers.

In some embodiments, the instructions may include instructions for updating at least one of the one or more classifiers independently from instances of the one or more classifiers. In these embodiments, the new instances of each of the one or more classifiers may be created from updated versions of the one or more classifiers. In addition, the data format requirements may be identified from updated versions of the one or more classifiers.

In some examples, transforming the audio/video data may further include downsampling the audio/video data for at least one of the instances of the one or more classifiers when the audio/video data exceeds the data format requirements for the at least one instance. Additionally or alternatively, transforming the audio/video data may include cropping the audio/video data for at least one of the instances of the one or more classifiers to satisfy the data format requirements for the at least one instance.

In some embodiments, decoding the video stream may further include decoding the video data into the lowest quality video data that satisfies the data format requirements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a video understanding platform designed to efficiently handle the classification of a tremendous volume of audio/video streams (e.g., hundreds of millions of videos per day) in real-time (or near real-time). As will be explained in greater detail below, embodiments of the instant disclosure may decode an audio/video stream a single time for multiple machine-learning classifiers (as opposed to performing a separate decode operation for each classifier), potentially resulting in significant performance advantages. Moreover, by utilizing pluggable classifier instantiations (instead of classifiers that are hardcoded into the platform's architecture), classifier updates can be deployed on-the-fly without taking the platform offline (thereby avoiding platform downtime). In addition, any older classifier instances may be allowed to independently run to completion, thus terminating gracefully. Finally, by invoking a unique instance of the platform for each audio/video stream, the disclosed systems may easily scale to accommodate the ever-growing demands of audio/video services.

Figure 1:
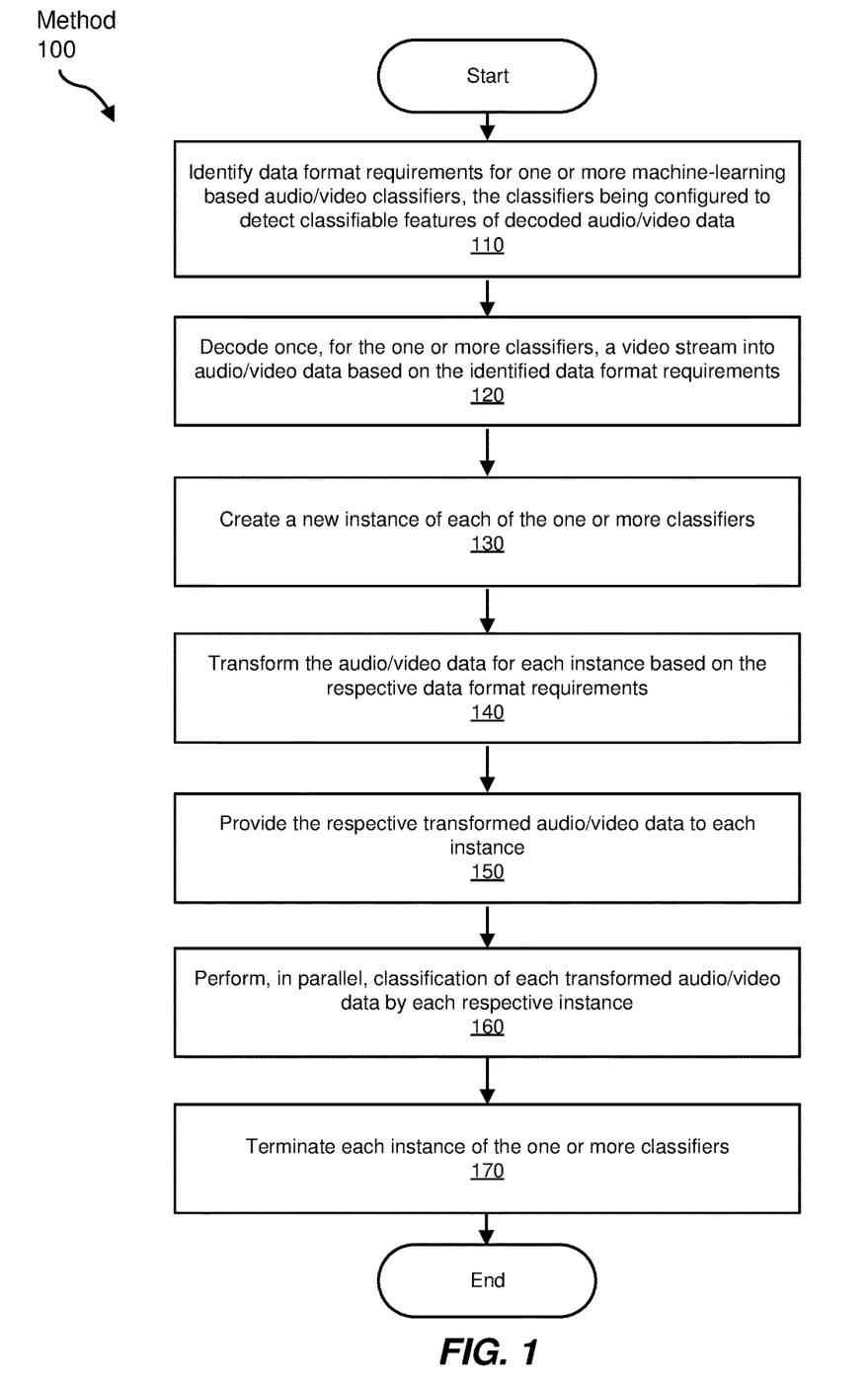
FIG. 1 is a flow diagram of an exemplary method for managing a video understanding platform.

FIG. 1 is a flow diagram of an exemplary computer-implemented method 100 for utilizing a video understanding platform. The steps shown in FIG. 1 may be performed by any suitable computer-executable code and/or computing system, including the system(s) illustrated in FIGS. 2 and 5. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may identify data format requirements for one or more machine-learning-based audio/video classifiers that are configured to detect classifiable features of decoded audio/video data. The systems described herein may perform step 110 in a variety of ways. In one example, a video understanding platform may be implemented within or executed by server 206 in FIG. 2. In this example, the video understanding platform may (via, e.g., server 206) identify the data format requirements for the audio/video classifiers (e.g., classifiers 272). As used herein, the term "audio/video" may refer to audio data, video data, or a combination of audio and video data. Similarly, the term "video stream" may, in some examples, refer to both live audio/video content (such as a live broadcast) and/or previously recorded audio/video content (such as pre-recorded audio/video files).

Figure 2:
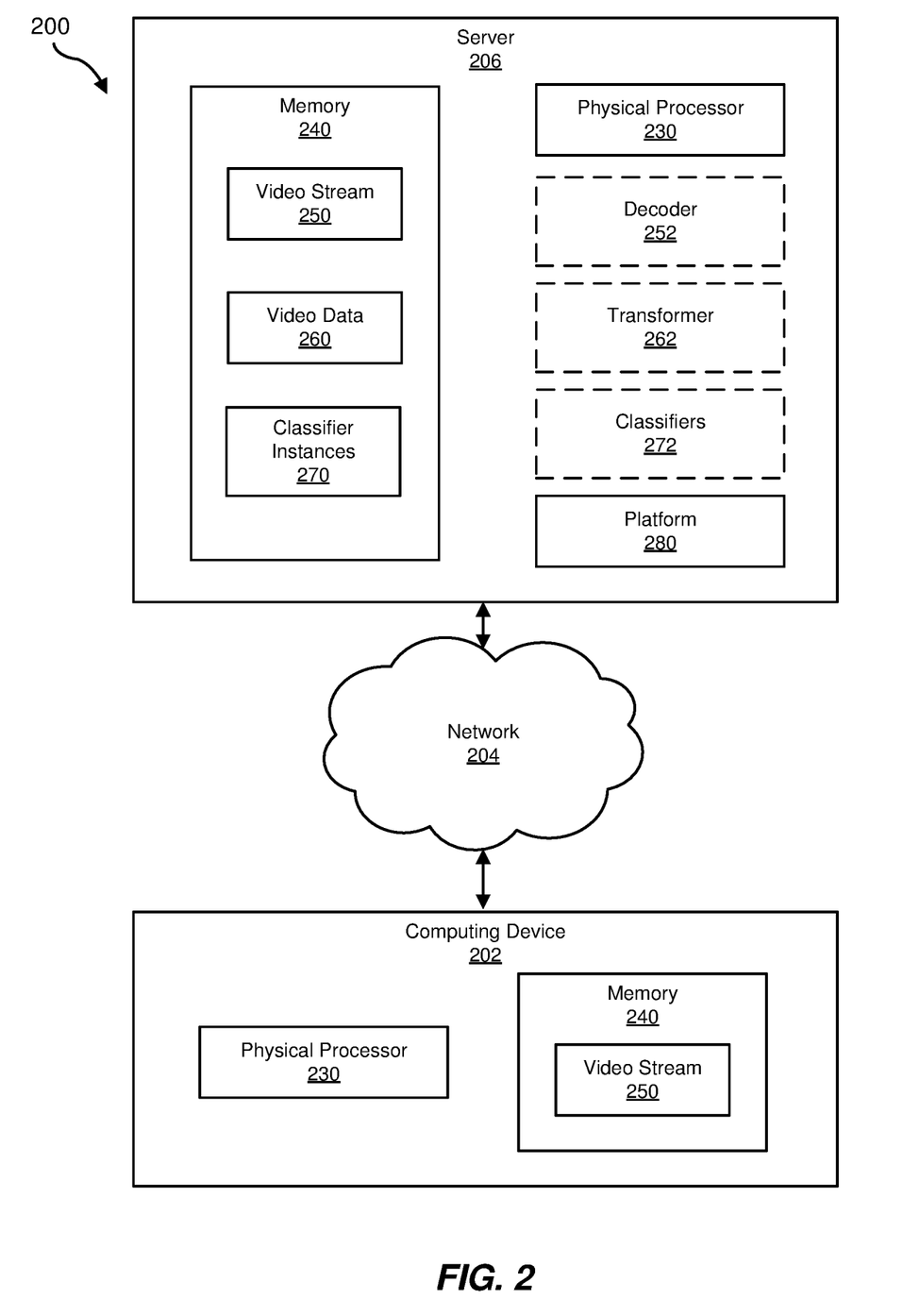
FIG. 2 is a block diagram of an exemplary system for a video understanding platform.

In some examples, a "dispatcher" may be instantiated (by, e.g., server 206) when the video understanding platform obtains or otherwise identifies a new video stream to be processed. In these examples, the dispatcher may be tasked with (1) identifying the data format requirements for each audio/video classifier and then (2) instantiating a decoder for decoding the video stream in question. The term "instance" may, in some examples, refer to an occurrence of a particular software object, such as a running process of a set of program instructions. Similarly, term "new instance" may refer to an instance that is separate from other instances and, in certain circumstances, that is independent from other instances.

In the above example, by creating a new instance of the dispatcher for each video stream, the video understanding platform may allow a copy of the dispatcher to run for each video stream (and only for that video stream). In some examples, this dispatcher may be associated with a web service, such as a social network. Accordingly, when the social network encounters unclassified audio/video content (such as when a user uploads a new video, the social network identifies archived video that has not been classified, or a user initiates a live broadcast), the social network may instantiate the dispatcher to correctly classify, in real-time (or near real-time) the unclassified audio/video content.

FIG. 2 illustrates an exemplary network environment 200 capable of implementing aspects of the present disclosure. As illustrated in this figure, network environment 200 may include a computing device 202, a network 204, and server 206. Computing device 202 may be a client device or user device, such as a desktop computer, laptop computer, tablet device, smartphone, gaming platform, virtual/augmented reality device, or other computing device. Computing device 202 may include a physical processor 230, which may represent one or more processors, and memory 240, which may store data such as a video stream 250. Video stream 250 may represent audio/video data, which may be provided to a video understanding platform, such as may be running on server 206. Video stream 250 may represent, for instance, content created by a user of computing device 202 and uploaded to the internet. As detailed above, video stream 250 may represent a live stream or saved and/or edited audio/video content.

Server 206 may represent one or more servers capable of hosting a video understanding platform. As detailed above, this video understanding platform may process audio/video data using one or more classifiers. In one example, this video understanding platform may perform tasks on behalf of (or be integrated within) a social network. This social network may represent a service that is accessible to users through computing devices that are connected through a network, such as the internet. The social network may enable users may establish connections with other users, such that the social network may provide a platform for users to interact and communicate with other users. For example, users may share content (including web pages or links), user-generated content (such as photos and videos), and comment on or message each other through the social network.

As shown in FIG. 2, server 206 may include a physical processor 230, which may represent one or more processors, and memory 240, which may store data as described herein. Server 206 may also include a decoder 252, a transformer 262, one or more classifiers 272, and a platform 280. Decoder 252 may include hardware and/or software instructions for decoding audio/video data (in order to, e.g., decompress the audio/video data). Similarly, transformer 262 may include hardware and/or software instructions for performing various transformation operations on audio/video data. Examples of such transformation operations include, without limitation, downsampling operations, which may include rescaling video data to a lower resolution, and cropping operations, which may include removing portions of video frames to change the aspect ratio.

Classifiers 272 may represent machine-learning-based audio/video classifiers, which may include hardware and/or software instructions for analyzing semantic content of audio/video data. For example, classifiers 272 may be configured to detect and/or classify features from decoded audio/video data such as objects, faces, shapes, motions, patterns, sounds, music, etc. Classifiers 272 may be implemented using any of a variety of algorithms, such as deep-learning-based and machine-learning-based algorithms, including convolutional neural networks and other computer vision or artificial intelligence applications. Although classifiers 272 may be configured to process decoded video data, classifiers 272 may, in certain implementations, be configured to process encoded audio/video data or other forms of processed and/or unprocessed audio/video data. One or more of decoder 252, transformer 262, and classifiers 272 may reside on server 206 or may be accessible to server 206.

Platform 280 may represent a video understanding system, which may be implemented in software and/or hardware. In some examples, platform 280 may represent a process running on server 206. The term "process" may, in some examples, refer to an instance of a computer program that is being executed. The term "subprocess" may, in some examples, refer to a process created by another process. In one example, platform 280 may represent a background process running on server 206 managing aspects of the video understanding platform. For example, platform 280 may instantiate server subprocesses, monitor the health of these server subprocesses (by, e.g., determining if errors have occurred or if performance has been adversely affected), and control the lifetimes of these server subprocesses (by, e.g., waiting until the server subprocesses complete processing of their respective assigned video streams before terminating the server subprocesses). Platform 280 may also redirect video streams to active server subprocesses and manage processing loads between the server subprocesses. In addition, platform 280 may further monitor any new versions or changes to settings of plugins and other software, such as decoder 252, transformer 262, and classifiers 272, such that any subprocess of platform 280 and subprocesses thereof would instantiate the newest versions of the plugins or other software.

A server subprocess may correspond to a video server for managing video data, and each server subprocess may create new instances of the dispatcher for each video stream directed to the server subprocess. Each server subprocess may include video server settings, which may be, for example, settings for plugins or video streams. Platform 280 may also monitor server subprocess settings for changes to the video server settings and instantiate new server subprocesses when the video server settings are updated. Platform 280 may further notify the server subprocesses to updates to the plugins used by the server subprocesses. Thus, platform 280 may be a "wrapper" in that platform 280 may encompass and control, either directly or indirectly, functions of the video understanding system, for example through a hierarchy of processes and subprocesses (e.g., platform 280 may create server subprocesses which then create dispatcher instances). However, platform 280 may be implemented through other hierarchies, such as platform 280 creating dispatcher instances directly, or multiple instances of platform 280 communicating with each other to manage dispatcher instances and/or server subprocesses.

As detailed above, server 206 may include memory 240, which may store a video stream 250, video data 260, and classifier instances 270. In addition, video stream 250 may represent audio/video content, such as audio/video content broadcast or uploaded by computing device 202 or another computing device. In one example, video stream 250 may represent encoded audio/video data. In contrast, video data 260 may represent processed audio/video data, such as a decoded or transformed version of video stream 250. In addition, classifier instances 270 may represent instances of classifiers 272 that have been locally instantiated by server 206 for processing specific audio/video data, such as video data 260.

As shown in FIG. 2, computing device 202 may be communicatively coupled to server 206 through network 204. Network 204 may represent any communication network, such as the internet, and may comprise one or more physical connections, such as a Local Area Network (LAN), and/or wireless connections, such as a Wireless Area Network (WAN).

As detailed above, the dispatcher instantiated by server 206 (e.g. by platform 280 directly or indirectly through a server subprocess from platform 280) may identify data format requirements for classifiers 272. For example, classifiers 272 may require audio/video data in a particular format, such as a particular resolution, aspect ratio, bitrate, the exclusion of video data, the exclusion of audio data, etc. Rather than determine the data format requirements for all available classifiers 272, server 206 may identify data requirements for only those classifiers 272 that will be applied to video stream 250. The classifiers 272 that are to be applied to a given video stream may be predefined or based on the various characteristics of the video stream in question, such as the source of the video stream (e.g., a particular social network or other website, a live stream, a pre-recorded video uploaded by a user, etc.). For instance, live video may prioritize real-time classification and, therefore, the classifiers predefined or preselected for processing live video may be based on relatively quick and sufficient classification. The corresponding data format requirements may not be as high quality as those of an on-demand video, such as stored or archived video content available for viewing or downloading, which may prioritize robust classification over real-time processing.

As detailed above, classifiers 272 may be stored and/or updated independently from the video understanding system. As such, in some examples the video understanding system may identify the data format requirements from updated versions of the classifiers. For example, the video understanding platform may store or access updated versions of classifiers 272 to determine the data format requirements that are required for video stream 250.

At step 120, one or more of the systems described herein may decode once, for the one or more classifiers, a video stream into audio/video data based on the identified data format requirements. The systems described herein may perform step 120 in a variety of ways. In one example, the video understanding platform, which may be implemented on server 206, may generate a single instance of decoder 252 to decode video stream 250 into video data 260.

In some examples, the step of decoding the video stream may include decoding the video data into the lowest quality video data that satisfies the data format requirements identified in step 110. As detailed above, each of classifiers 272 may have different data format requirements, such as resolution, aspect ratio, etc. In addition, certain classifiers 272 may be used for classifying audio data only. This audio data may also have data format requirements, such as bitrate, normalized volume, etc. In conventional video understanding systems, a video stream may be decoded for each required data format requirement, which may result in multiple decode operations. However, since these decoding operations are processor-intensive, each decode operation may incur significant overhead, potentially resulting in hardware bottlenecks when performing multiple decode operations. In addition, decoded video data may require various upscaling operations, such as operations used to increase video resolution using interpolation or other similar algorithms to add extra data to the video and fill in missing information. To address these issues, embodiments of the present disclosure may involve performing a single decode (or transform) operation for a given video stream.

To determine decoding parameters, the video understanding platform may determine the lowest quality video data that satisfies all of the data format requirements of the classifiers 272 to be applied to video stream 250. By doing so, video data 260 may meet or exceed the data format requirements of each of the necessary classifiers and/or avoid the need to perform multiple upscale operations.

At step 130, one or more of the systems described herein may create a new instance of each of the one or more classifiers. The systems described herein may perform step 130 in a variety of ways. In one example, the video understanding platform, which may be implemented on server 206, may create classifier instances 270. As detailed above, classifier instances 270 may represent a single instance of each classifier 272 to be applied to the video stream 250. By creating new instances of each classifier 272, video stream 250 may utilize its own set of classifiers 272 without impacting other video streams that are currently being processed and/or classified.

In some examples, the video understanding platform may maintain classifiers 272 such that updates to classifiers 272 reside on server 206. Alternatively, the video understanding platform may access classifiers 272 from another computing device such that server 206 may access updated versions when available. Creating new instances of the classifiers rather than reusing existing instances may ensure that the most recent versions of classifiers 272 are used for each new video stream. In addition, older instances may be terminated upon completion such that the most up-to-date version of each classifier is used when processing a new video stream.

By implementing classifiers 272 as discrete, standalone modules, each classifier 272 may be changed or otherwise updated on the fly without having to reconfigure the architecture of the video understanding platform. Classifier instances 270 may also allow older instances executing in connection with existing streams to run in parallel without affecting each other such that the streams may not be interrupted or the video understanding platform may not need to be brought offline to update classifiers 272. Moreover, the modularity of classifiers 272 may prevent a buggy, misbehaving, or otherwise problematic classifier from negatively impacting other classifiers or classifier instances.

At step 140, one or more of the systems described herein may transform the audio/video data for each instance based on the respective data format requirements. The systems described herein may perform step 140 in a variety of ways. In one example, the video understanding platform, which may be implemented on server 206, may transform video data 260 using, for example, one or more instances of transformer 262. Because video data 260 may include decoded audio/video data satisfying at least one of the data format requirements, further transformation may not be needed for at least one of classifier instances 270. For other classifier instances 270, the video understanding platform may appropriately transform video data 260.

In some examples, the step of transforming the audio/video data may include downsampling the audio/video data for at least one of the instances of the one or more classifiers when the audio/video data exceeds the data format requirements of the at least one instance. Rather than decoding again video stream 250 into the lower resolution, the video understanding platform may downsample video data 260 using transformer 262 or an instance thereof.

Figure 3:
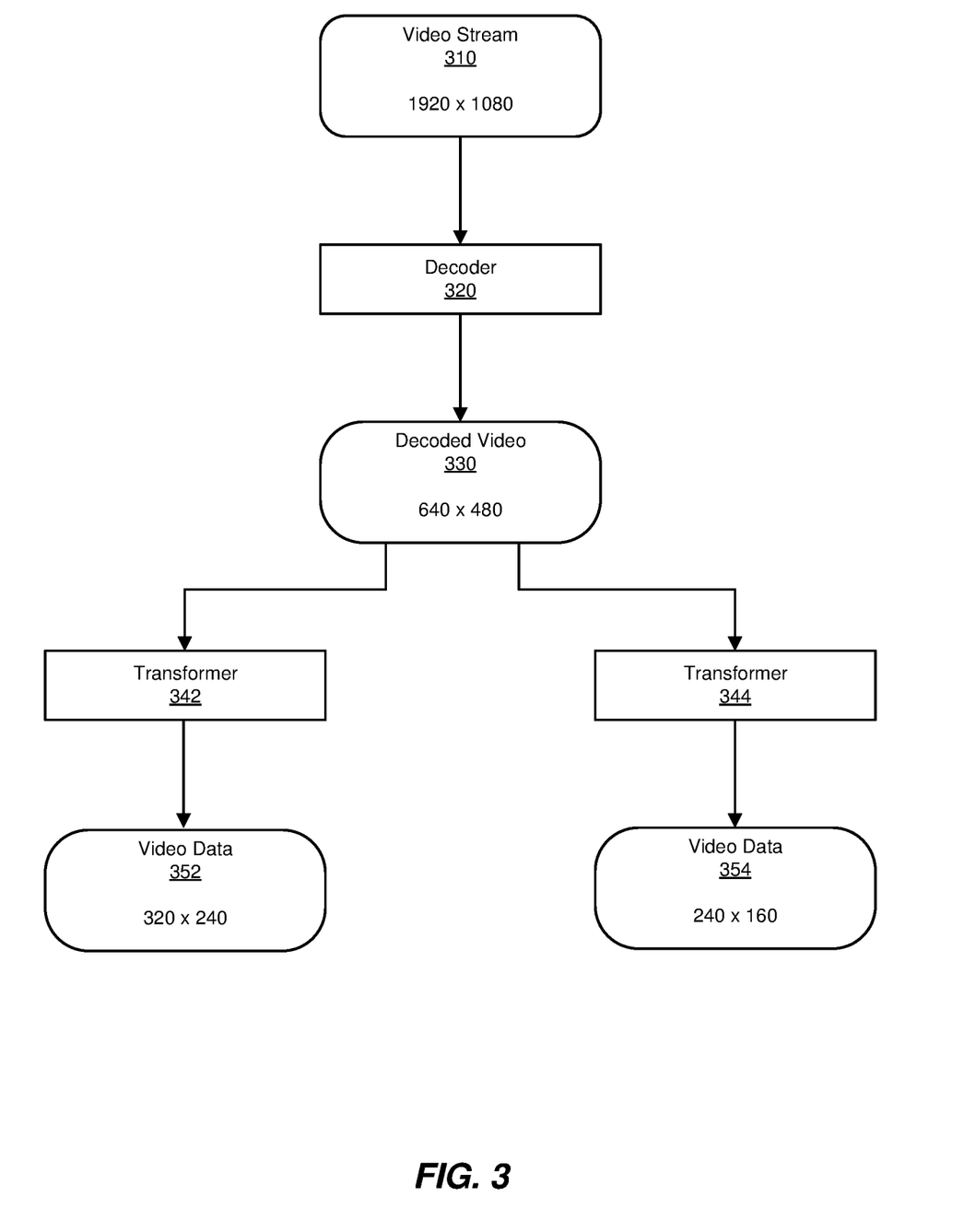
FIG. 3 is a diagram of exemplary video transformations.

FIG. 3 shows a flowchart of an exemplary audio/video data transformation. In this example, video stream 310, which may correspond to video stream 250, may represent source audio/video data having a resolution of 1920×1080. Decoder 320, which may correspond to decoder 252 or be an instance thereof, may represent a decoder that has decoded video stream 310 into decoded video 330 at a resolution of 640×480. In this example, transformer 342, which may correspond to transformer 262 or be an instance thereof, may downsample decoded video 330 to video data 352 having a resolution of 320×240. In addition, transformer 344, which may correspond to transformer 262 or be an instance thereof, may downsample decoded video 330 to video data 354 having a resolution of 240×160. Video data 260 may include video data 352, video data 354, as well as decoded video 330.

Although FIG. 3 describes downsampling transformations, other transformations, such as downscaling operations, may be applied as needed to meet data format requirements. In downscaling or other scaling operations, the width and height of the video data may change while preserving its aspect ratio, which may be the proportional relationship between width and height. These transformations may also include stretching, in which the width and/or height of the video data is changed without preserving the aspect ratio. In addition, these transformations may include cropping, which may change the aspect ratio. The transformations may also include color space transformations, in which color data associated with the video data is changed from one color space to another color space. Color space may refer to an organization of colors allowing for reproducible representations of color in analog and/or digital representations. Example color spaces may include red, green, blue (RGB), hue, saturation, value (HSV), etc. Thus, transforming audio/video data may include transforming the audio/video data for at least one of the instances of the one or more classifiers to satisfy the data format requirements for the at least one instance. As detailed above, transformation operations may also include multiple transformations, such as downsampling and cropping.

The above-described transformations may also include transforming audio data. In addition, these transformations may include changing sampling rates, which may refer to a rate at which audio waveforms are converted to digital values, such at 44.1 kHz or 96 kHz. These transformations may also include changing a number of channels, such as surround sound, which may include six channels, to stereo sound, which may include two channels. Each channel may refer to a separate audio signal. The transformations may also include changing sample formats, for example from 24 bits to 16 bits. A sample format may refer to a number of bits used for representing each audio sample, with a greater number of bits corresponding to higher quality. The transformations may also include removing video data such that only audio data remains. As detailed above, transformation operations may be less resource-intensive than decode operations. As such, performing transformation operations on decoded video data, as opposed to performing decode operations for each of a plurality of classifiers, may reduce processing overhead.

At step 150, one or more of the systems described herein may provide the respective transformed audio/video data to each instance. The systems described herein may perform step 150 in a variety of ways. In one example, the video understanding platform, which may be implemented on server 206, may provide transformed audio/video data, which may be included in video data 260, to classifier instances 270. Because the decoded video data has been transformed, classifier instances 270 may receive audio/video data satisfying their respective data format requirements.

At step 160, one or more of the systems described herein may perform, in parallel, classification of each transformed audio/video data by each respective instance. The systems described herein may perform step 160 in a variety of ways. In one example, the video understanding platform, which may be implemented on server 206, may execute each of classifier instances 270 in parallel. As detailed above, classifier instances 270 may represent classifiers for recognizing objects, recognizing faces, recognizing music, recognizing speech, etc.

At step 170, one or more of the systems described herein may terminate each instance of the one or more classifiers. The systems described herein may perform step 170 in a variety of ways. In one example, the video understanding platform, which may be implemented on server 206, may perform each of classifier instances 270 to completion for video stream 250. Although classifier instances 270 may be performed in parallel, each of classifier instances 270 may complete at different times. By terminating current classifier instances 270, the video understanding platform may ensure that the next instance of each particular classifier 272 created will be created from updated versions. Classifier instances 270 may terminate on their own, for example, when their respective classifications are completed or, alternatively, the video understanding platform may explicitly terminate classifier instances 270 upon receiving results from the same.

Figure 4:
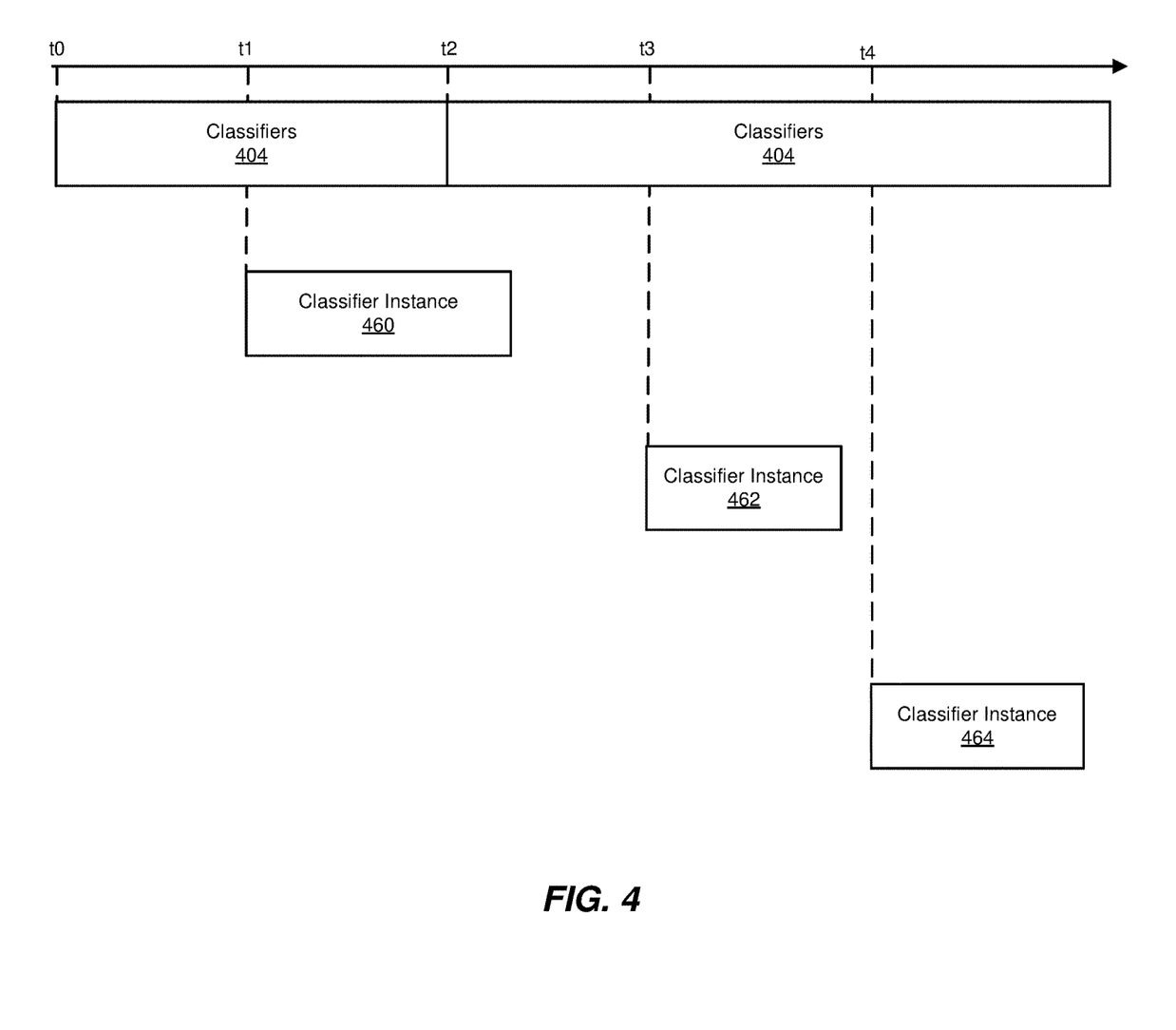
FIG. 4 is an exemplary timing diagram for creating classifier instances.

FIG. 4 shows an exemplary timeline of instance creation and termination. At time t0, classifiers 404, which may correspond to classifiers 272, may be updated. At time t1, classifier instance 460, which may correspond to one of classifier instances 270, may be created. At time t2, classifiers 404 may be updated, which may make classifier instance 460 an obsolete instance. As detailed above, classifiers 404 may be updated without affecting classifier instance 460. As such, classifier instance 460 may run to completion to prevent disruption of a current classification of a video stream. Classifier instance 460 may then be terminated to ensure that the obsolete instance is not further used. Subsequent instances may be created from the most recent or updated version of classifiers 404. For example, at time t3 classifier instance 462 may be created from the updated classifiers 404. At time t4, classifier instance 464 may be created from the updated classifiers 404. By creating new instances each time one of classifiers 404 is invoked, obsolete versions of classifiers 404 may not be used, allowing for graceful transition into the updated versions. Thus, the modularity of the classifiers may allow older instances to run to completion and graceful termination without delaying updates to the classifiers, and new instances of the classifiers may be created from updated versions of the classifiers without impacting any running instances.

Figure 5:
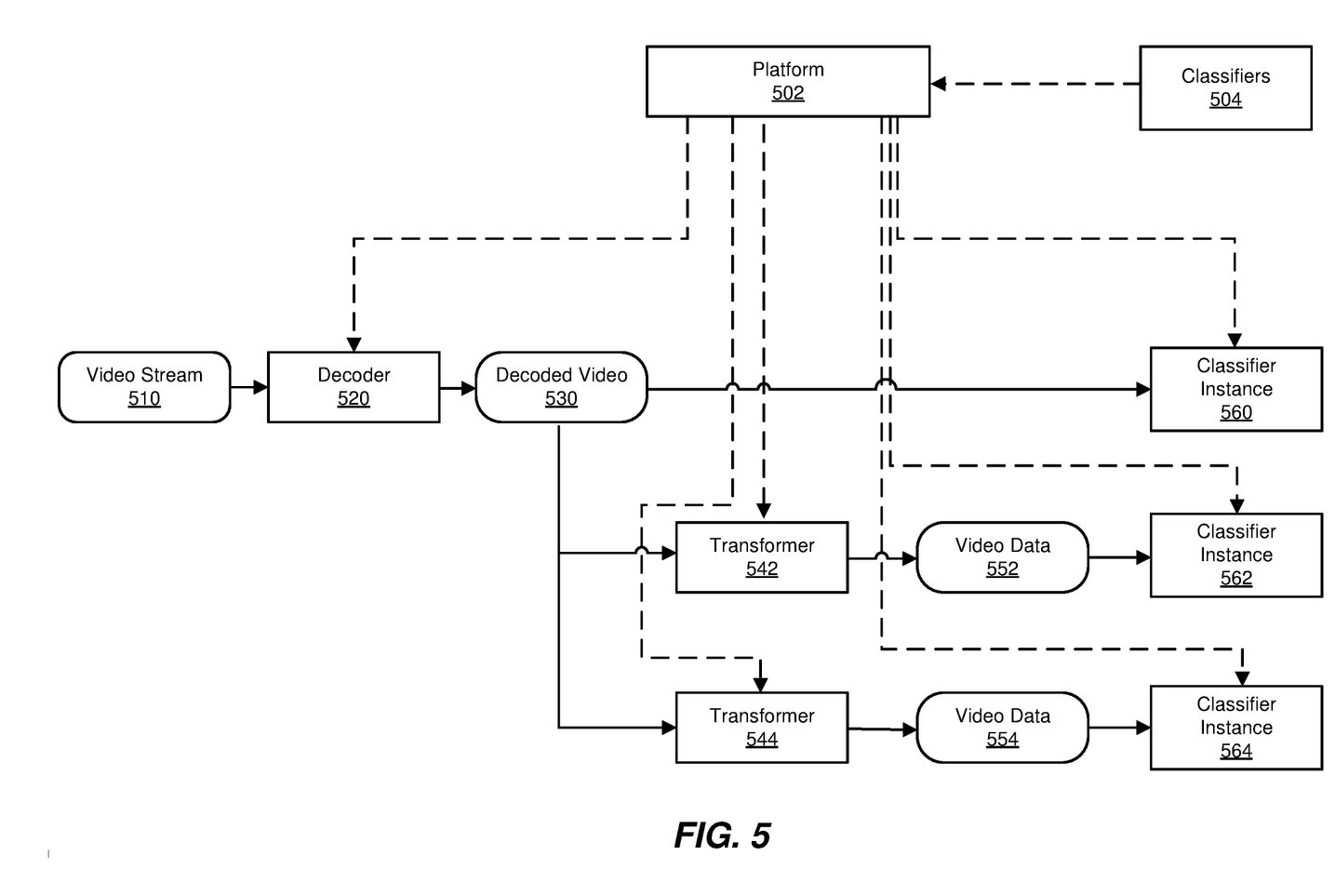
FIG. 5 is a block diagram of an exemplary video understanding platform.

FIG. 5 shows a block diagram of an exemplary video understanding platform. Platform 502, which may run on server 206, may manage classifiers 504, a video stream 510, a decoder 520, a decoded video 530, a transformer 542, a transformer 544, video data 552, video data 554, a classifier instance 560, a classifier instance 562, and a classifier instance 564. As seen in FIG. 5, platform 502 may act as a dispatcher managing various instances of classifiers, decoders, transformers, and/or other modules, creating and/or terminating instances of modules as needed. In one example, platform 502 may manage only its own module instances, such that each instance of platform 502 may be independent from, or otherwise fail to affect, other instances of platform 502 (e.g., for other video streams).

Classifiers 504, which may correspond to classifiers 272, may represent machine-learning audio/video classifiers and may be implemented as plugins or a library of plugins or as separate executable applications. In one example, classifiers 504 may be maintained separately from platform 502, tested in their own respective sandboxes before pushed to a live or production environment. The term "sandbox," in some examples, may refer to a testing environment for isolating test modules or code from a production environment. Classifiers 504 may be associated with parameters, such as data format requirements that specify the format required for classifiers 504 to analyze. As such, when classifiers 504 are updated, their respective parameters may also be updated.

In one example, platform 502 may access classifiers 504 to determine their data format requirements (e.g., as part of an initiation process for classifiers 504). In this example, platform 502 may identify a data format that satisfies or exceeds the data format requirements of each of the classifiers and then instantiate decoder 520 for decoding video stream 510 into decoded video 530. From classifiers 504, platform 502 may create classifier instance 560, classifier instance 562, and classifier instance 564.

In this example, decoded video 530 may be provided, untransformed, to classifier instance 560 since decoded video 530 may satisfy the data format requirements for classifier instance 560. However, decoded video 530 may not satisfy the data format requirements for classifier instance 562 and classifier instance 564.

Platform 502 may transform decoded video 530 using transformer 542, which may correspond to transformer 262, to produce video data 552. In this example, video data 552 may satisfy the data format requirements of classifier instance 562. Platform 502 may also transform decoded video 530 using transformer 544, which may correspond to transformer 262, to produce video data 554. In this example, video data 554 may satisfy the data format requirements of classifier instance 564.

As detailed above, this document describes a video understanding platform capable of classifying a tremendous number of audio/video streams (e.g., millions of videos per day) in real-time or near real-time. For a given audio/video stream, the disclosed video understanding platform may identify and access machine-learning-based audio/video classifiers that are to be applied to the audio/video stream and then determine data format requirements for the same. The video understanding platform may then decode (based on the identified data format requirements) the audio/video stream a single time for all classifiers in order to avoid performing multiple decode operations (i.e., in order to avoid performing a separate decode operation for each classifier). The platform may then instantiate the classifiers (i.e., create instances of each classifier that is to be applied to the audio/stream stream) and pass transformed audio/video data to the same for classification. After the classification operations are complete, the platform may terminate the classifier instances. Since the platform can operate independently from the classifiers, the classifiers may be updated independent of the platform architecture itself, which may enable classifier updates to be deployed on-the-fly without taking the platform offline (thereby avoiding platform downtime). In addition, because the platform creates new classifier instances from the most updated version of classifiers, the platform may enable the seamless updating of classifiers without affecting current classification operations. Moreover, because decode operations are performed a single time for a given audio/video stream, processing overhead may be significantly reduced, resulting in increased performance. Finally, by invoking a unique instance of the platform for each audio/video stream, the disclosed systems may easily scale to accommodate the ever-growing demands of audio/video services.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive audio/video data to be transformed, transform the audio/video data, output a result of the transformation to be classified, use the result of the transformation for classifying the audio/video data, and store the result of the transformation to index the audio/video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying data format requirements for one or more machine-learning-based audio/video classifiers, the classifiers being configured to detect classifiable features of decoded audio/video data;
    decoding once, for the one or more classifiers, a video stream into audio/video data based on the identified data format requirements;
    creating a new instance of each of the one or more classifiers;
    transforming the audio/video data for each instance based on its respective data format requirements;
    providing the respective transformed audio/video data to each instance;
    performing, in parallel, classification of each transformed audio/video data by each respective instance; and
    terminating each instance of the one or more classifiers.

2. The method of claim 1, further comprising updating at least one of the one or more classifiers independently from instances of the one or more classifiers.

3. The method of claim 2, wherein the new instances of each of the one or more classifiers are created from the updated versions of the one or more classifiers.

4. The method of claim 2, wherein the data format requirements are identified from the updated versions of the one or more classifiers.

5. The method of claim 1, wherein transforming the audio/video data further comprises downsampling the audio/video data for at least one of the instances of the one or more classifiers when the audio/video data exceeds the data format requirements for the at least one instance.

6. The method of claim 1, wherein transforming the audio/video data further comprises cropping the audio/video data for at least one of the instances of the one or more classifiers to satisfy the data format requirements for the at least one instance.

7. The method of claim 1, wherein decoding the video stream further comprises decoding the video data into a lowest quality video data satisfying the data format requirements.

8. A system comprising:
    one or more processors;
    a memory device comprising instructions that, when executed by the one or more processors, cause the system to:
        identify data format requirements for one or more machine-learning-based audio/video classifiers, the classifiers being configured to detect classifiable features of decoded audio/video data;
        decode once, for the one or more classifiers, a video stream into audio/video data based on the identified data format requirements;
        create a new instance of each of the one or more classifiers;
        transform the audio/video data for each instance based on its respective data format requirements;
        provide the respective transformed audio/video data to each instance;
        perform, in parallel, classification of each transformed audio/video data by each respective instance; and
        terminate each instance of the one or more classifiers.

9. The system of claim 8, wherein the instructions further comprise instructions for updating at least one of the one or more classifiers independently from instances of the one or more classifiers, wherein the new instances of each of the one or more classifiers are created from updated versions of the one or more classifiers.

10. The system of claim 9, wherein the data format requirements are identified from updated versions of the one or more classifiers.

11. The system of claim 8, wherein transforming the audio/video data further comprises downsampling the audio/video data for at least one of the instances of the one or more classifiers when the audio/video data exceeds the data format requirements for the at least one instance.

12. The system of claim 8, wherein transforming the audio/video data further comprises cropping the audio/video data for at least one of the instances of the one or more classifiers to satisfy the data format requirements for the at least one instance.

13. The system of claim 8, wherein decoding the video stream further comprises decoding the video data into a lowest quality video data satisfying the data format requirements.

14. A non-transitory computer-readable medium comprising computer-readable instructions that, when executed by at least one processor of a computing device, cause the computing device to:
    identify data format requirements for one or more machine-learning-based audio/video classifiers, the classifiers being configured to detect classifiable features of decoded audio/video data;
    decode once, for the one or more classifiers, a video stream into audio/video data based on the identified data format requirements;
    create a new instance of each of the one or more classifiers;
    transform the audio/video data for each instance based on its respective data format requirements;

provide the respective transformed audio/video data to each instance;

perform, in parallel, classification of each transformed audio/video data by each respective instance; and terminate each instance of the one or more classifiers.

15. The non-transitory computer-readable medium of claim 14, further comprising instructions for updating at least one of the one or more classifiers independently from instances of the one or more classifiers.

16. The non-transitory computer-readable medium of claim 15, wherein the new instances of each of the one or more classifiers are created from updated versions of the one or more classifiers.

17. The non-transitory computer-readable medium of claim 15, wherein the data format requirements are identified from updated versions of the one or more classifiers.

18. The non-transitory computer-readable medium of claim 14, wherein transforming the audio/video data further comprises downsampling the audio/video data for at least one of the instances of the one or more classifiers when the audio/video data exceeds the data format requirements for the at least one instance.

19. The non-transitory computer-readable medium of claim 14, wherein transforming the audio/video data further comprises cropping the audio/video data for at least one of the instances of the one or more classifiers to satisfy the data format requirements for the at least one instance.

20. The non-transitory computer-readable medium of claim 14, wherein decoding the video stream further comprises decoding the video data into a lowest quality video data satisfying the data format requirements.

* * * * *